United States Patent Office 2,773,545
Patented Dec. 11, 1956

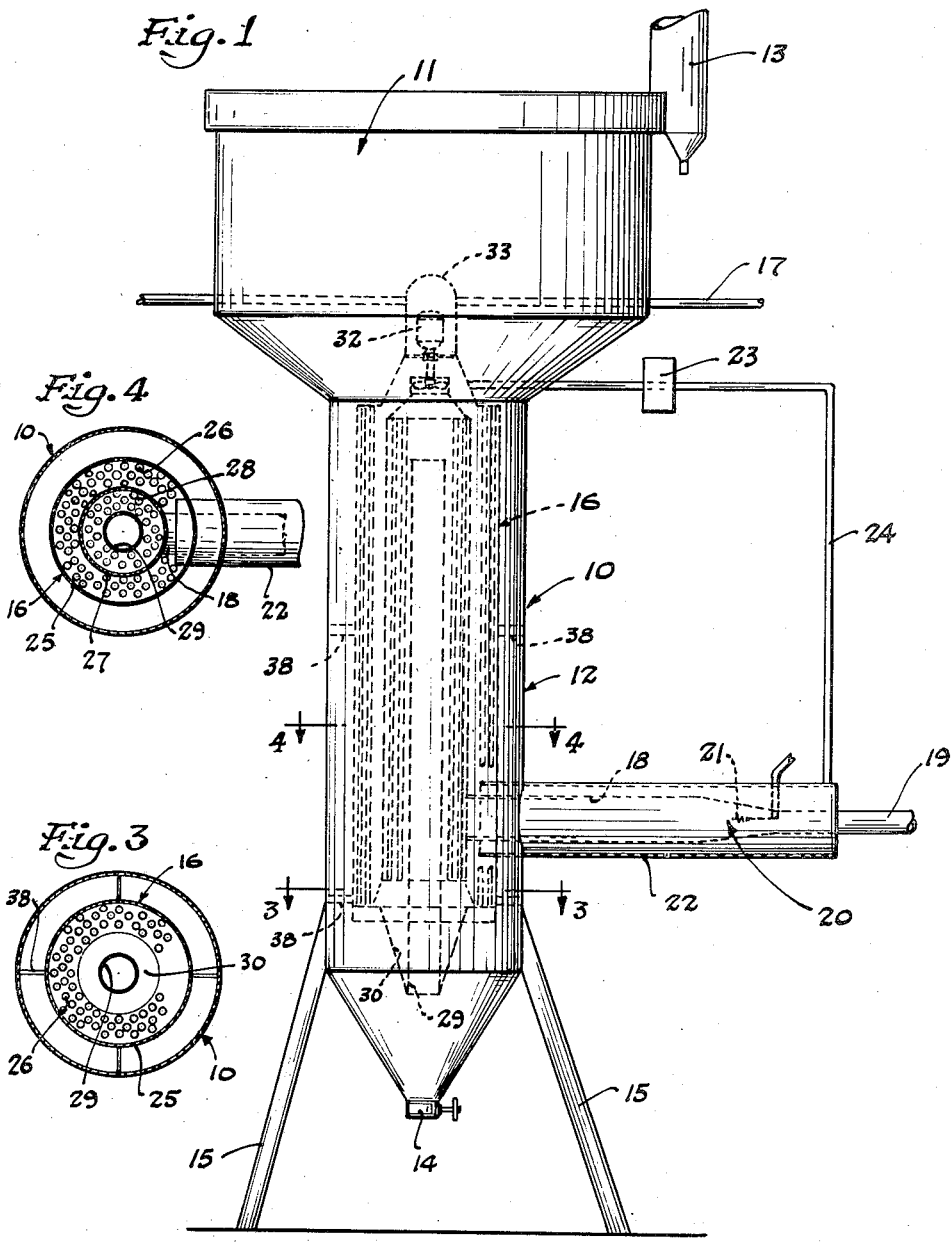

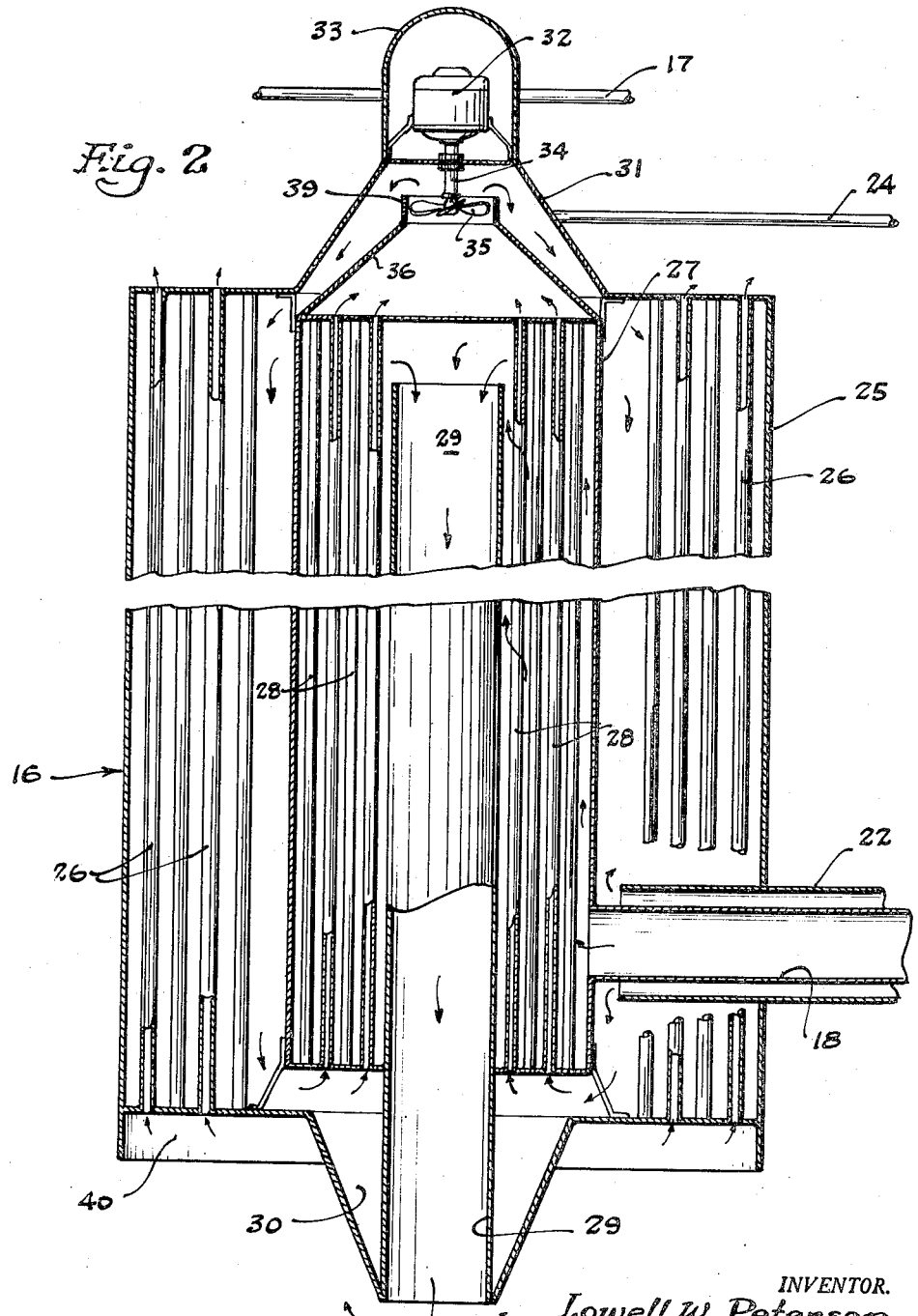

2,773,545

SUBMERGED COMBUSTION EVAPORATION

Lowell W. Petersen, Homewood, Ill., assignor to Swift & Company, Chicago, Ill., a corporation of Illinois Application October 24, 1952, Serial No. 316,640

5 Claims. (Cl. 159—16)

This invention relates to an apparatus for the concentration of charrable, heat-sensitive liquids and more particularly to an apparatus for effecting the concentration of such liquids by direct contact therewith of combustion gases which have been cooled to a point where charring of the liquid is avoided. The apparatus of the instant invention may be utilized to carry out the method described and claimed in my copending application, Serial No. 260,847, filed December 10, 1951, now U. S. Patent #2,704,120, said application being a division of application, Serial No. 111,744, filed August 22, 1949, now U. S. Patent #2,702,594.

The concentration of charrable, heat-sensitive liquids has in the past generally been carried out by indirect heat exchange only, utilizing jacketed vessels of various types wherein the heat medium was separated from the liquid to be concentrated by metal walls or the like. The principal reason for this has been the difficulty encountered in the prevention of charring or burning of the liquids when direct contact of the heating gases with the liquid was provided. It is well known that direct gas contact with the liquid to be concentrated is a more efficient means of heat transfer and in addition the bubbling of the gases through the liquid provides agitation thereof with a further gain in efficiency of heating. This direct contact combustion gas type of concentration is widely used in the evaporation and concentration of inorganic liquids. However, the problem with respect to the concentration of heat-sensitive organic liquids is much more difficult. Organic liquids, such as milk, whey, and the like, are extremely heat-sensitive and direct contact of hot combustion gases with such liquids has in the past resulted in considerable charring and burning of the material being concentrated. For example, when whey is being concentrated for use in animal foods the resulting product of a direct contact combustion gas evaporation is of a blackish-brown color due to charring rather than of the desirable light brown, tan, or cream color of concentrated whey made by less efficient evaporating and concentrating methods. In contrast to the difficulties of charring and the like, the increased efficiency and lower costs of a direct contact combustion concentration plant make it very desirable from the standpoint of economy that some means be devised to permit the use of direct contact combustion gas concentration in the concentration of charrable, heat-sensitive liquids.

Therefore, it is an object of this invention to provide an apparatus for effecting the concentration of heat-sensitive liquids by direct contact with combustion gases without appreciable charring taking place.

It is a further object of this invention to provide a means for cooling hot combustion gases prior to direct introduction thereof into a charrable liquid being concentrated.

Additional objects, if not specifically set forth herein, will be readily apparent to one skilled in the art from the following detailed description of the invention.

In the drawings:

Fig. 1 illustrates an evaporator body containing the heat exchange unit of the present invention (shown in dotted lines for the purpose of locating the position of such unit within the evaporator body). This figure is designed to show certain features which are optional for use with the heat exchange unit which itself is more fully illustrated in the remaining drawings.

Fig. 2 represents a sectional front elevation of the heat exchange unit of the present invention, illustrating in schematic form the relationship between and direction of flow of the various gaseous and liquid components of the system.

Fig. 3 represents a cross-sectional view of the heat exchange unit taken on line 3—3 of Fig. 1.

Fig. 4 represents a cross-sectional view of the heat exchange unit of the present invention taken on the line 4—4 of Fig. 1.

Generally the present invention relates to an apparatus comprising a self-contained heat exchange unit adapted to be inserted into any evaporator body and, when used in conjunction with a source of hot combustion gases, to provide a means for cooling such gases to a non-charring temperature prior to direct contact of said gases with the liquid to be concentrated, while still retaining the heat of said gases to provide an efficient concentration.

More specifically, referring now to Fig. 1 of the drawings, there is illustrated a conventional evaporator 10 having an upper vapor space 11 and a lower liquid-containing body portion 12. The evaporator is provided with a suitable vapor stack 13, concentrate removal means 14, and suitable supporting means 15. The heat exchange unit which comprises the heart of the present invention is illustrated in dotted lines at 16. This unit is more fully illustrated and described in connection with the remaining drawings. However, in order to accurately locate the position of such a unit 16 within an evaporator 10, certain portions of said unit are identified on Fig. 1. For example, 17 represents the cooling means for the motor which drives the heat exchange fluid impeller (more fully described below), and 20 represents a source of hot combustion gases, shown here as a gas burner, said source of hot combustion gases communicating with the heat exchange unit 16 through tube 18 as more fully described below. While the gases may be supplied from any suitable source, it is preferred to utilize a burner, which may be of any conventional type, located as illustrated in close proximity to the evaporator shell 10. The fuel for the burner is fed from a suitable supply source (not shown) through line 19 into the combustion chamber of the burner 20 wherein it is ignited in the conventional manner by an electrical ignition system 21. Surrounding the burner and completely enclosing it and tube 18 up to its connection with heat exchange unit 16 is a chamber 22 adapted to contain heat transfer fluid circulated by means of pump 23 from the lower end of heat exchange unit 16 into said jacket 22 and thence through pipe 24 and into the upper portion of heat exchange unit 16.

Referring now to Fig. 2 of the drawings, 16 represents the heat exchange unit of the present invention. This unit may be said to comprise in general three sections. The outermost section has been designated as 25 and preferably comprises a cylindrical shell containing a plurality of vertical risers or tubes 26 open at both top and bottom to provide communication with the liquid-containing body portion of the evaporator body within which the unit is to be positioned. The second portion of the heat exchange unit 16 preferably comprises a second cylindrical shell 27 disposed annularly within the first shell 25. Shell 27 likewise contains a plurality of tubes or risers 28 open at each end, but these tubes 28 are sealed from communication with the liquid-containing body portion of the evaporator space in a manner described below. The third comprises a relatively large diameter cylindrical tube disposed annularly within shell 27 and extending downwardly therethrough from a point below the top of said shell to a point substantially below the bottom of shells 25 and 27. This tube 29 is open at both top and bottom thereof.

For the sake of clarity in the drawings, only a few of the plurality of tubes disposed within shells 25 and 27 have been illustrated. Shell 25, having a plurality of open risers or tubes 26 extending therethrough, is closed at the bottom by a connection with tube 29 to form a cone-shaped reservoir 30 as shown in Fig. 2. Shell 25 extends both above and below inner shell 27; shell 25 having disposed at about the center thereof a raised portion formed by members 31. It will be seen from the drawings that shell 25 therefore comprises essentially a completely sealed chamber having extending therethrough about the outermost annular portion a plurality of vertical risers open at each end. Mounted atop the elevated upper portion of shell 25 is a motor of conventional design 32, completely enclosed within a liquid-tight shell 33. This motor is cooled in its operation by means of air admitted through tubes 17 extending laterally from shell 33 to the exterior of the evaporator body as shown in the dotted lines of Fig. 1. Motor 32 drives, through shaft 34, an impeller 35. This impeller is mounted within the elevated portion of shell 25 and serves to create a flow of the heat exchange fluid within said shell as more fully described below. Shell 27 is disposed immediately beneath the raised portion of shell 25 and is provided at its upper end with an inverted cone-shaped baffle member 36 which extends upwardly towards and is attached to impeller collar 39 which surrounds impeller 35. Tube 29, disposed annularly as aforesaid within shell 27, is so arranged as to communicate with shell 27 at its upper end, and with the liquid-containing portion of the evaporator body at its lower end. Extending laterally into and through shell 25 at one side thereof is a tube 18 which communicates, as illustrated in Fig. 1, with a source of hot combustion gases. Tube 18 is connected to and communicates at its inner end with shell 27. Surrounding tube 18 as it enters the heat exchange unit 16 is a jacket 22, likewise shown in Fig. 1 of the drawings. This jacket 22 communicates at its innermost end with the lower portion of shell 25 and, as shown in Fig. 1, is connected at its other end via pipe 24 with the upper portion of shell 25.

A more detailed illustration of shell 25 is afforded by Fig. 3 of the drawings. Referring now to this figure, it will be seen that the vertical tubes or risers 26 are so arranged and disposed within shell 25 as to leave a substantial amount of space within shell 25 between said tubes 26. It likewise will be seen from Fig. 3 that shell 25 is annularly disposed about tube 29. Fig. 3 is a cross-sectional view taken on the line 3—3 of Fig. 1 with the addition of some of those tubes 26 omitted from Fig. 2 for the sake of clarity in the drawing.

A more detailed illustration of shell 27 is afforded by Fig. 4 of the drawings. This figure illustrates a cross-sectional view of shell 27 taken on line 4—4 of Fig. 1, adding, as in the case of Fig. 3, some of the plurality of vertical risers or tubes 28 which were omitted from Fig. 2 for the sake of clarity. This drawing likewise illustrates the annular positioning of shell 27 about the centrally located tube 29. Also shown in this view is the manner in which the source of hot combustion gases 18 is connected to shell 27. As in the earlier figures, 22 represents the jacket which surrounds tube 18 communicating with the source of hot combustion gases.

Referring now to the operation of the apparatus of the present invention, the heat exchange unit 16 is disposed within the liquid-containing body portion of an evaporator body as shown in Fig. 1 of the drawings. The unit is supported within the evaporator by any suitable brackets or supporting members as illustrated at 38 in Fig. 1. In operation hot combustion gases pass through tube 18 and into shell 27 wherein they surround the vertical tubes 28 and the concentrically located tube 29. The hot combustion gases pass upwardly through shell 27, swirling about tubes 28 and 29, and at the top of shell 27 pass into and downwardly through tube 29, exiting at the base thereof into the body of liquid being concentrated. During the upward passage through shell 27, the hot combustion gases are cooled to a non-charring temperature by indirect heat exchange with a heat transfer or heat conducting fluid contained within tubes 28 and shell 25. It will be noted from Fig. 2 of the drawings that tubes 28 are in communication both at top and bottom thereof with the interior of shell 25. Suitable heat transmitting or conducting fluid is contained within shell 25 and, both by virtue of the heat imparted to the fluid within tubes 28 and also by the action of impeller 35, is continually circulated in the direction of the arrows shown in Fig. 2 upwardly through tubes 28, through inverted cone 36, and thence downwardly within shell 25 to again re-enter the vertical risers 28. The heat transmitting or conducting fluid may be any suitable vaporizable fluid or liquid, organic, inorganic, or metallic heat transmitting fluid of the types well known to the art. As aforesaid, the hot combustion gases, by virtue of the indirect heat transfer through the walls of the plurality of vertical risers 28, impart much of their heat to the heat transfer fluid contained within risers 28. Transfer of heat to cool tube 18 is effected as the gases enter through said tube by means of heat transfer to the fluid within the jacket 22 surrounding tube 18. Jacket 22, as illustrated in Figs. 1 and 2, communicates with the lower portion of shell 25 at one end and is connected at its other end through pipe 24 with the upper portion of shell 25. A suitable pump 23 may be disposed in line 24, as illustrated in Fig. 1, to insure adequate circulation of the fluid through jacket 22. The cooled combustion gases pass downwardly through pipe 29, as aforesaid, and into the body of liquid to be concentrated. The gases mix with this liquid and bubble upwardly therethrough. Almost all of the gases entering the liquid from pipe 29 are directed, along with the concentrating liquid, into vertical tubes 26 by the gas-retaining ring 40 in the manner shown by the arrows on Fig. 2. Tubes 26 are annularly disposed about the interior of shell 25. As the mixture of gas and liquid rises through tubes 26, additional heat is transferred from the heat transfer fluid passing downwardly around risers 26 through the walls of risers 26 to the mixture of gases and liquid passing upwardly inside of these risers. As the mixture exits from the upper ends of tubes 26, the gases continue up through the liquid and are discharged through vapor stack 13 as shown in Fig. 1. The liquid, of course, remains within the liquid-containing portion of the evaporator body and again is contacted with the incoming partially cooled hot gases from tubes 29. As illustrated in Figs. 1 and 2, the impeller 35 is driven by a motor 32 positioned above shell 25. This motor is cooled in operation by air admitted through tubes 17 from the exterior of the evaporator body. When the liquid contained within the body portion of the evaporator is concentrated to the desired degree, it may be drawn off through line 14 (Fig. 1) at the base of the evaporator for further processing.

It is obvious that the combustion gases may be supplied from any suitable source, although, as indicated, it is preferred to utilize a burner located adjacent the evaporator shell. Any conventional burner known to the art may be utilized in conjunction with the heat exchange means of the present invention. Further, the heat exchange unit of the present invention may be utilized for low pressure operation as well as for recirculation of heat transfer fluid. In such event an easily vaporized heat transfer fluid, such as water, would be maintained within shell 25. The fluid would be vaporized within tubes 28 by virtue of the heat imparted to it by the hot gases passing upwardly within shell 27. These vapors would then pass into shell 25, condense on the outside of tubes 26, and pass downwardly to reservoir 30 for revaporization inside of the liquid circulating tubes 28.

The temperature of the hot combustion gases leaving the combustion chamber will vary to a considerable extent, depending on the fuel used. A typical gaseous fuel, such as a natural gas composed of approximately 82.8 percent $CH_4$, 16.3 percent $C_2H_6$, and 0.8 percent illuminants, when mixed with 9 to 10 volumes of air will produce a temperature of about 1,800–2,800° F. in the combustion chamber, depending upon the gas-air ratio used. These gases, by passage through the apparatus disclosed and claimed herein, will be reduced in temperature at their point of contact with the liquid to be concentrated, i. e., at the base of tube 29, to any predetermined gas temperature of approximately 190° F. to approximately 700° F., depending upon the heat transfer surface built into heat transfer unit 16. The liquid to be concentrated will not rise within tube 29 to any appreciable extent by virtue of the pressure of the cooled gases as they pass downwardly through tube 29.

As can be seen from the foregoing description, the apparatus of the present invention successfully overcomes the disadvantages of the prior art use of direct contact combustion gas concentration of charrable, heat-sensitive, or organic liquids, thereby opening up a new and more efficient field of concentrating such liquids to the industry. This invention is of particular value to the dairy, sugar, and other industries engaged in concentrating solutions of organic materials. It is obvious that the invention could be used in the concentration of inorganic solutions, but it would in general find small usage in such fields since the problem of charring, as pointed out above, is usually not present in the concentration of most inorganic solutions.

The term "charring" as used in the specification and appended claims describes the condition at which concentrating organic products begin to approach a blackish color. By the term "charrable" is meant that property of the product which renders it subject to charring.

Obviously, many modifications and variations of the invention as hereinbefore set forth may be made without departing from the spirit and scope thereof, and therefore only such limitations should be imposed as are indicated in the appended claims.

I claim:

1. Apparatus for the concentration of charrable organic liquids, adapted to be disposed within the liquid-containing portion of an evaporator body, comprising: a completely closed shell having a plurality of open tubes extending therethrough about the periphery thereof means associated with said shell for introducing a heat exchange medium thereinto; a second completely closed shell disposed concentrically within said first mentioned shell; a plurality of open tubes extending through and disposed about the periphery of said second shell, said tubes of said second shell communicating at each end thereof with the interior of said first mentioned shell; means for introducing hot combustion gases within said second mentioned shell; and conduit means located concentrically within said second mentioned shell, said conduit means being open at both ends thereof, one of said ends extending through said first and second mentioned shells and the other of said ends communicating with the interior of said second mentioned shell.

2. Apparatus for the concentration of charrable organic liquids which comprises, in combination with an evaporator body containing a charrable organic liquid: a completely closed shell disposed within the liquid containing evaporator body; means for introducing hot gases into said shell; a completely closed, self-contained heat transfer system surrounding both said closed shell and said means for introducing hot gases therein; a plurality of open tubes extending through said completely closed shell and communicating at each end thereof with said heat transfer system; an outlet providing communication between the interior of said shell and said charrable organic liquids for removing gases from said shell for use in direct heating of said charrable organic liquids after cooling of said gases by indirect heat exchange with said heat transfer system; and means included in said heat transfer system for indirectly heating the said charrable organic liquids.

3. A device suitable for submerged heat exchange with a substance, which comprises: a shell, a second shell positioned within said first-mentioned shell, a plurality of conduits extending through said first-mentioned shell and partially surrounding said second shell, outlet and inlet means communicating with said second shell, additional conduit means extending through said second shell and communicating with the interior of said first-mentioned shell, said additional conduit means at least partially surrounding the point of communication of said outlet means with said second shell, and means associated with said first shell for introducing a heat exchange medium thereinto.

4. A device suitable for direct and indirect heat exchange in adjusting the temperature of a substance, which comprises: a shell, outlet and inlet means associated with said shell, conduits extending through said shell and completely closed off from communication with the interior of said shell, a second shell surrounding said first-mentioned shell, said conduits communicating with the interior of said second shell, said outlet means extending through said second shell and closed from communication with the interior thereof, additional conduits extending through said second shell and closed from communication with the interior thereof, and means associated with said second-mentioned shell for introducing a heat exchange medium thereinto.

5. A device suitable for concentrating heat-sensitive material which comprises: a closed heat transfer system, conduits extending through the interior of said system to conduct heat-sensitive material through said system and provide indirect heat transfer between said system and said heat-sensitive material, a second heat transfer system mounted within said first-mentioned heat transfer system and out of communication with the interior of said first-mentioned heat transfer system, additional conduits extending through the interior of said second system and communicating with the interior of said first-mentioned system, heat transfer material confined in said first-mentioned system, circulating means associated with said first-mentioned system to circulate said heat transfer material through said first-mentioned system and through said additional conduits, means for introducing a heating medium into the interior of said second heat transfer system, and outlet means associated with the interior of said second heat transfer system and extending through said first-mentioned heat transfer system out of communication with the interior thereof, said outlet means being suitable for introducing said heating medium directly into said heat-sensitive material following the partial cooling of said heating medium by indirect contact with the heat transfer material of said first-mentioned heat transfer system.

References Cited in the file of this patent

UNITED STATES PATENTS 54,730  Howell _____ May 15, 1866

(Other references on following page)

UNITED STATES PATENTS

| | | |
|---|---|---|
| 740,655 | Hornbrook | Oct. 6, 1903 |
| 1,371,038 | Liebzeit | Mar. 8, 1921 |
| 1,794,801 | Souter | Mar. 3, 1931 |
| 1,891,534 | Gray | Dec. 20, 1932 |
| 2,538,412 | Cecil et al. | Jan. 16, 1951 |
| 2,582,134 | Kimmel et al. | Jan. 18, 1952 |
| 2,625,915 | Glasgow et al. | Jan. 20, 1953 |

FOREIGN PATENTS

| | | |
|---|---|---|
| 4,150 | Great Britain | Dec. 17, 1873 |
| 5,999 | Germany | Dec. 10, 1878 |
| 152,753 | Great Britain | Oct. 18, 1920 |
| 317,856 | Great Britain | July 24, 1930 |
| 407,056 | Great Britain | Mar. 9, 1934 |

OTHER REFERENCES

Evaporation by Submerged Combustion, Industrial and Eng. Chemistry, pps. 984–7, Sept. 1933.